United States Patent
Takahashi et al.

(10) Patent No.: US 9,601,776 B2
(45) Date of Patent: Mar. 21, 2017

(54) RESIN COMPOSITION

(71) Applicant: RIKEN TECHNOS CORPORATION, Tokyo (JP)

(72) Inventors: Tomohiro Takahashi, Tokyo (JP); Hidemasa Sugimoto, Tokyo (JP)

(73) Assignee: RIKEN TECHNOS CORPORATION, Tokyo (JP)

( * ) Notice: Subject to any disclaimer, the term of this patent is extended or adjusted under 35 U.S.C. 154(b) by 0 days.

(21) Appl. No.: 14/391,471

(22) PCT Filed: Mar. 29, 2013

(86) PCT No.: PCT/JP2013/059640
§ 371 (c)(1),
(2) Date: Oct. 9, 2014

(87) PCT Pub. No.: WO2013/153969
PCT Pub. Date: Oct. 17, 2013

(65) Prior Publication Data
US 2015/0076419 A1  Mar. 19, 2015

(30) Foreign Application Priority Data
Apr. 9, 2012 (JP) ................................ 2012-088593

(51) Int. Cl.
*H01B 1/06* (2006.01)
*H01M 4/62* (2006.01)
(Continued)

(52) U.S. Cl.
CPC .............. *H01M 4/624* (2013.01); *C08J 5/18* (2013.01); *C08J 7/04* (2013.01); *C08K 3/04* (2013.01);
(Continued)

(58) Field of Classification Search
CPC ........ H01M 4/366; H01M 8/188; B32B 27/08
(Continued)

(56) References Cited

U.S. PATENT DOCUMENTS 7,842,433 B2   11/2010 Nakanishi et al.
2008/0099732 A1   5/2008 Nagao et al.
(Continued)

FOREIGN PATENT DOCUMENTS

CN   101768367 A   7/2010
JP   H01149370 A   6/1989
(Continued)

OTHER PUBLICATIONS

Takase, "Dispersion Technique and Evaluation of Carbon Nanotubes," Seikei-Kakou, vol. 18, No. 9, 2006, pp. 646-652.
(Continued)

*Primary Examiner* — Khanh Tuan Nguyen
(74) *Attorney, Agent, or Firm* — Oliff PLC

(57) ABSTRACT

The present invention provides a resin composition for an electrically conductive resin film which is excellent in electric conductivity, tensile elongation, durability to bending and flexibility and is suitable as electrodes or protective coatings on the electrodes in redox flow batteries. A resin composition includes (A) 100 parts by mass of a thermoplastic resin, (B) 1 to 60 parts by mass of carbon nanotubes and (C) 1 to 100 parts by mass of at least one selected from the group consisting of acetylene black and graphite.

8 Claims, 1 Drawing Sheet

(51) Int. Cl.

| | | |
|---|---|---|
| *H01M 8/18* | (2006.01) | |
| *H01M 8/02* | (2016.01) | |
| *C08J 7/04* | (2006.01) | |
| *H01B 1/24* | (2006.01) | |
| *C08K 3/04* | (2006.01) | |
| *C08K 7/24* | (2006.01) | |
| *C08J 5/18* | (2006.01) | |
| *C08K 7/06* | (2006.01) | |
| *C08L 23/02* | (2006.01) | |

(52) U.S. Cl.
CPC .................. *C08K 7/06* (2013.01); *C08K 7/24* (2013.01); *H01B 1/24* (2013.01); *H01M 8/0226* (2013.01); *H01M 8/0243* (2013.01); *H01M 8/188* (2013.01); *C08J 2323/06* (2013.01); *C08J 2323/28* (2013.01); *C08K 2201/001* (2013.01); *C08K 2201/011* (2013.01); *C08L 23/02* (2013.01); *Y02E 60/528* (2013.01)

(58) Field of Classification Search
USPC .................................. 429/221, 127; 252/506
See application file for complete search history.

(56) References Cited

U.S. PATENT DOCUMENTS

| | | |
|---|---|---|
| 2010/0163795 A1 | 7/2010 | Kim et al. |
| 2011/0147640 A1* | 6/2011 | Kim ....................... B82Y 30/00 |
| | | 252/62 |
| 2011/0193030 A1 | 8/2011 | Kolditz et al. |
| 2011/0193031 A1 | 8/2011 | Kolditz et al. |
| 2011/0315934 A1 | 12/2011 | Ma et al. |
| 2012/0058378 A1* | 3/2012 | Lee ........................ B32B 27/08 |
| | | 429/127 |
| 2013/0037760 A1* | 2/2013 | Maeda ................ H01M 8/0213 |
| | | 252/511 |
| 2015/0037673 A1* | 2/2015 | Zaghib .................. H01M 4/136 |
| | | 429/221 |

FOREIGN PATENT DOCUMENTS

| | | | |
|---|---|---|---|
| JP | H04259754 A | 9/1992 | |
| JP | H0753813 A | 2/1995 | |
| JP | H08-259767 A | 10/1996 | |
| JP | H11100512 A | 4/1999 | |
| JP | 2001015144 A | 1/2001 | |
| JP | 2003132913 A | 5/2003 | |
| JP | 2005200620 A | 7/2005 | |
| JP | 2006111870 A | 4/2006 | |
| JP | 2008156401 A | 7/2008 | |
| JP | 2009-155436 A | 7/2009 | |
| JP | 2009144000 A | 7/2009 | |
| JP | WO 2011/129215 * | 10/2011 | ............. H01M 8/18 |
| JP | 2011228059 A | 11/2011 | |
| JP | 2012500317 A | 1/2012 | |
| JP | 2012022910 A | 2/2012 | |
| JP | 2012507586 A | 3/2012 | |
| JP | 2012507587 A | 3/2012 | |
| KR | 10-0833782 B1 * | 5/2008 | ............. C08K 3/02 |
| WO | 2006/106609 A1 | 10/2006 | |
| WO | 2011/129215 A1 | 10/2011 | |

OTHER PUBLICATIONS

May 28, 2013 International Search Report issued in International Application No. PCT/JP2013/059640.
Nov. 13, 2015 Search Report issued in European Patent Application No. 13776098.9.

* cited by examiner

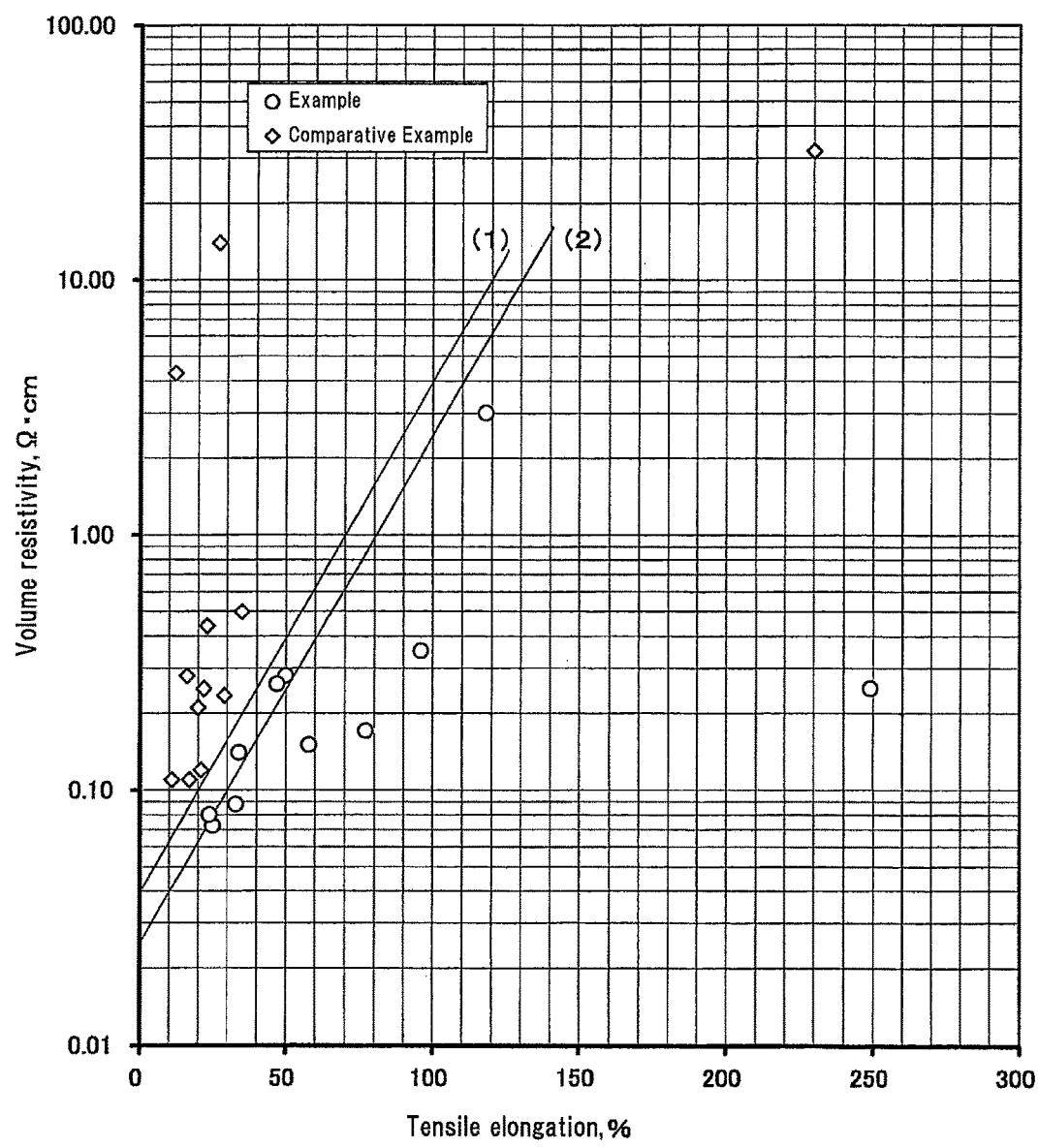

RESIN COMPOSITION

CROSS REFERENCE

This application claims the benefits of Japanese Patent application No. 2012-88593 filed on Apr. 9, 2012, the contents of which are hereby incorporated by reference.

FIELD OF THE INVENTION

The present invention relates to a resin composition for electrically conductive resin films. More particularly, the present invention relates to a resin composition for electrically conductive resin films which are excellent in tensile elongation, durability to bending and flexibility.

BACKGROUND OF THE INVENTION

Recently, so-called renewable energy, for example, solar power generation, wind power generation and wave power generation, has attracted attention as new energy sources in place of fossil fuel, such as petroleum, and nuclear power. However, the renewable energy is strongly affected by weather and, therefore, is very unstable in output. When supplying a large amount of the renewable energy to power grids, it is necessary, for example, to provide high-capacity batteries to level the fluctuating output.

One example of the high-capacity battery is a redox flow battery. The redox flow battery comprises two kinds of ionic solutions which are separated with a cation exchange membrane, in each of which solutions an electrode is placed. At the electrodes, an oxidation reaction and a reduction reaction occur simultaneously to cause charge and discharge. For example, in a redox flow battery in which an aqueous sulfuric acid solution containing vanadium is used at each pole, vanadium (IV) is oxidized to vanadium (V) at the positive pole, and vanadium (III) is reduced to vanadium (II) at the negative pole for the charge. In the discharge, the reverse reactions occur. The redox flow batteries have an advantage that it is easy to provide large-capacity ones. The batteries function at room temperature. Further, no combustible or explosive material is used or generate in the batteries. Therefore, they are very safe, compared to sodium-sulfur batteries and lithium ion secondary batteries.

Electrodes of redox flow batteries are immersed in an electrolyte such as an aqueous sulfuric acid solution. Further, oxidation and reduction reactions occur at the electrodes. Therefore, the electrodes need to have high electric conductivity and chemical resistance. Accordingly, carbon fiber assemblies or platinum plating have been used in the electrodes. However, the carbon fiber assemblies allow a liquid to pass through and, therefore, have a problem that the junction with a copper wire is affected by an aqueous sulfuric acid solution passed through the assemblies. The platinum plating is a very good conductor and is excellent in chemical resistance, but has a drawback that it is of a noble metal and costly.

Therefore, electrically conductive resin films comprising electrically conductive carbon such as ketjen black have been proposed as the electrodes (see Patent Literatures 1 to 4), or electrodes made of carbon fiber assemblies or of copper plates have been coated with the aforesaid electrically conductive resin film. However, when the electrically conductive resin film comprises an enough amount of electrically conductive carbon to have sufficiently high electric conductivity, the film is very poor in tensile elongation, durability to bending or flexibility and, therefore, easily breaks by a physical force. When the amount of electrically conductive carbon is so small to secure good tensile elongation, durability to bending and flexibility, the volume resistivity of the film exceeds 10 Ω·cm to increase internal resistance of a redox flow battery in which the film is used as the electrodes or coatings on the electrodes, which makes the battery unsatisfactory.

In recent years, carbon nanotubes have attracted attention as conductive carbon and been expected to solve the aforesaid problems (see Patent Literature 5 and Non-Patent Literature 1). However, carbon nanotubes have problems that they are difficult to be spread and, therefore, very difficult to be dispersed in resins. Therefore, a large amount of carbon nanotubes must be added, like ketjen black, in order to obtain satisfactorily high electric conductivity and, therefore, the resulting electrically conductive resin film is practically inferior in tensile elongation, durability to bending and flexibility. When high shearing stress is applied in spreading and dispersion steps in order to obtain better spreading and dispersion of carbon nanotubes, the carbon nanotubes break and, therefore, it is again necessary to use a large amount of carbon nanotubes in order to obtain satisfactorily high electric conductivity.

An electrically conductive film has been proposed, made of a composition obtained by mixing carbon black or carbon nanotubes with propylene-olefin copolymer wax to prepare a master batch which is then mixed with an organic polymer (see Patent Literatures 6 and 7). The master batch makes it possible to incorporate carbon black or carbon nanotubes in a large amount into the polymer. However, the electric conductivity of the resulting film is not enough.

PRIOR ART LITERATURES

Patent Literatures

Patent Literature 1: Japanese Patent Application Laid-Open No. Hei 1-149370/1989
Patent Literature 2: Japanese Patent Application Laid-Open No. Hei 4-259754/1992
Patent Literature 3: Japanese Patent Application Laid-Open No. Hei 7-053813/1995
Patent Literature 4: Japanese Patent Application Laid-Open No. 2001-015144
Patent Literature 5: Japanese Patent Application Laid-Open No. 2006-111870
Patent Literature 6: Japanese Patent National Phase Publication No. 2012-507586
Patent Literature 7: Japanese Patent National Phase Publication No. 2012-507587

Non-Patent Literature

Non-Patent Literature 1: Takase, Hirofumi, "Dispersion Technique and Evaluation of Carbon Nanotubes", Seikei-Kakou, Vol. 18, No. 9, 2006, pp. 646-652

SUMMARY OF THE INVENTION

Purpose of the Invention

An object of the present invention is to provide a resin composition for an electrically conductive resin film which is excellent in tensile elongation, durability to bending and flexibility and is suitable as electrodes or protective coatings on the electrodes in electrolyte-circulating secondary batteries such as redox flow batteries, zinc-chlorine batteries and zinc-bromine batteries.

Means for Achieving the Purpose

The present inventors have found that the aforesaid problems are solved by adding carbon nanotubes together with acetylene black and/or graphite to a thermoplastic resin.

Thus, the present invention is a resin composition comprising
(A) 100 parts by mass of a thermoplastic resin,
(B) 1 to 60 parts by mass of carbon nanotubes, and
(C) 1 to 100 parts by mass of at least one selected from the group consisting of acetylene black and graphite.

Effects of the Invention

The film made of the present composition has high electric conductivity and is excellent in tensile elongation, durability to bending and flexibility and, therefore, can suitably be used as electrodes or protective coatings on the electrodes in electrolyte-circulating secondary batteries such as redox flow batteries, zinc-chlorine batteries and zinc-bromine batteries.

BRIEF DESCRIPTION ON THE DRAWING

FIG. 1 is a graph showing the relation between a volume resistivity, ρ, and a tensile elongation, E, of the films obtained in the Examples and the Comparative Examples.

EMBODIMENTS OF THE INVENTION (A) Thermoplastic Resin

Component (A) accommodates components (B) to (D) which are carbon fillers, and provides the resulting film with mechanical properties such as tensile elongation, durability to bending and flexibility. Examples of the thermoplastic resin include, for example, polyolefin resins such as polyethylene, polypropylene, polybuten-1, poly(4-methylpentene-1), chlorinated polyethylene, ethylene-α-olefin copolymers, ethylene-vinyl acetate copolymers, and ethylene-acrylic acid ester copolymers; polyvinyl chloride type resins such as polyvinyl chloride and vinyl chloride-vinyl acetate copolymers; polyamide type resins such as nylon 11 and nylon 12; polyurethane type resins; non-crystalline, low-crystalline or crystalline polyester type resins; acrylonitrile-butadiene-styrene copolymers (ABS resins); hydrogenated styrene-based elastomers such as hydrogenated styrene-conjugated diene copolymers; acrylic resins; silicone resins; polyvinylidene chloride type resins; and chloroprene resins. These may be appropriately used alone or in a combination of two or more of these according to a desired application of the electrically conductive resin film.

For example, in a case where the resulting electrically conductive resin film is used as electrodes or coatings on the electrodes in redox flow batteries in which an aqueous sulfuric acid solution containing vanadium is used at each pole, the film needs to be resistant to an aqueous sulfuric acid solution and, therefore, component (A) is preferably polyethylenes or chlorinated polyethylenes and, more preferably, chlorinated polyethylenes having a chlorine content of 25 to 45% by mass. In view of a film-forming property in calendering, crystalline chlorinated polyethylenes having a chlorine content of 25 to 45% by mass are most preferred.

It is noted that the crystalline chlorinated polyethylenes is intended to have melting enthalpy (ΔH) of 20 J/g or more in a second melting curve which is obtained in the final heating step of the following measurement program: keeping a sample at 190 degrees C. for 5 minutes, cooling to −10 degrees C. at a rate of 10 degrees C./min., keeping at −10 degrees C. for 5 minutes and then heating to 190 degrees at a rate of 10 degrees C./min. with DSCQ, type 1000, ex TA Instruments Japan. Examples of the crystalline chlorinated polyethylenes include ELASLEN 404B (trade name) and ELASLEN 303B (trade name), ex Showa Denko Inc.

(B) Carbon Nanotubes

The carbon nanotubes are fibrous materials in a form of a single-wall tube or of a tube with multiple walls coaxially laminated to each other, and have a diameter of approximately 1 to 250 nm and a length of approximately 0.1 to 250 μm. The wall is composed of a network of six-membered rings consisting of carbon atoms, i.e., graphene sheet. The carbon nanotubes function as an electrically conductive filler to provide the electrically conductive resin film with high electric conductivity. Therefore, the carbon nanotubes preferably have less lattice defects and high electric conductivity. Further, the carbon nanotubes preferably have a small bulk specific gravity so as to be easily spread.

Commercially available examples of the carbon nanotubes include Nanocyl NC7000 (trade name, ex Nanocyl S.A.) and VGCF-X (trade name, ex Showa Denko Inc.).

The amount of component (B) is 1 to 60 parts by mass, preferably 20 to 50 parts by mass, relative to 100 parts by mass of component (A). If the amount is less than the lower limit, the volume resistivity is higher than 10 Ω·cm. If the amount is too much, the tensile elongation, the durablity or the flexibility may not be enough.

(C) Acetylene Black and Graphite

Component (C) functions to secure good processability in steps of preparing (melt-kneading) the resin composition and forming a film. It functions also to help spreading and dispersion of carbon nanotubes (B) and, if any, carbon fiber (D), thereby increasing the electric conductivity of the film and improving mechanical properties such as tensile elongation. Further, component (C) itself has good electric conductivity and, therefore, functions to increase the electric conductivity of the film.

Acetylene black is carbon fine particles produced by pyrolysis of acetylene gas and is electrically conductive carbon black having a partially-graphitized structure. Commercially available examples of acetylene black include DENKA BLACK (trade name, ex Denki Kagaku Kogyou Inc.).

Besides acetylene black, ketjen black is known as electrically conductive carbon black. Although ketjen black has a high electric conductivity, it has a hollow shell form, unlike acetylene black. Therefore, a composition obtained by kneading ketjen black with a thermoplastic resin and the carbon nanotubes has less ductility in melting in a film-forming step and, therefore, may not be formed into a film.

Graphite is also called black lead and is mineral consisting of carbon atoms. Graphite encompasses natural graphite such as flake graphite and amorphous graphite, and synthetic graphite such as pyrolytic graphite. In the present invention, ground graphite is used which preferably has a mean particle diameter of 10 μm or less, more preferably 5 μm or less. If the particle diameter is too large, holes may occur in the electrically conductive resin film, convex portions may occur on the surface of the film, or elongation of the film may be small, which are all problematic. The mean particle diameter is a particle diameter at cumulative 50% by mass in a particle diameter distribution curve obtained with a laser diffraction and scattering type particle diameter analyzer, MT320011 (trade name, ex Nikkiso Co., Ltd.).

The amount of component (C) is 1 to 100 parts by mass, preferably 10 to 60 parts by mass, more preferably 20 to 50 parts by mass, relative to 100 parts by mass of component (A). If the amount is less than the lower limit, a balance between a volume resistance and a tensile elongation is lower, so that the equation (1) described below is not met. If the amount is too much, the tensile elongation, the durability to bending or the flexibility may not be enough.

(D) Carbon Fiber

Carbon fiber is obtained by heating to carbonize a precursor, organic fiber, and comprises carbon atoms in an amount of 90% by mass or more. Component (D) is an optional component which may be added to provide the film with further electric conductivity.

Carbon fiber can provide high electric conductivity in an orientation direction of fibers. However, electric conductivity in a direction vertical to the orientation direction is low. Therefore, electric conductivity of a film varies usually greatly depending on measurement positions and directions in the film. Surprisingly, when component (D) is added together with carbon components (B) and (C) to component (A), the aforesaid problem is significantly improved.

Component (D) preferably has a high electric conductivity in itself. Further, component (D) is preferably cut into a fiber length of approximately 1 to 15 mm so as to be easily melt-kneaded in a step of preparing the resin composition. Commercially available examples of the carbon fiber include Torayca Cut Fiber (trade name, ex Toray Industries, Ltd.).

The amount of component (D) is preferably 1 to 60 parts by mass, more preferably 10 to 30 parts by mass, relative to 100 parts by mass of component (A). If the amount is less than the lower limit, a less effect is attained by component (D). If the amount is too much, the tensile elongation, the durability to bending or the flexibility may not be enough.

The resin composition may further comprise known additives, such as, for example, lubricants, antioxidants, antiaging agents, weathering stabilizers such as light stabilizers and UV light absorbers, heat stabilizers, copper inhibitors, release agents, and surfactants, as long as the purpose of the invention is not impeded. The total amount of the additives is 0.001 to 5 parts by mass relative to 100 parts by mass of component (A).

Further, inorganic fillers other than components (B) to (D) may further be added as long as the purpose of the invention is not impeded. Examples of such inorganic fillers include light calcium carbonate, heavy calcium carbonate, magnesium silicate hydrate and talc. The amount of such inorganic fillers is 1 to 20 parts by mass relative to 100 parts by mass of component (A).

The present resin composition may be prepared by melt-kneading components (A) to (C) and, if necessary, component (D) and the other optional components with any known melt kneader. Examples of the melt kneader include batch-type kneaders such as pressure kneaders and mixers; kneading extruders such as co-rotating twin-screw extruders and counter-rotating twin-screw extruders; and calender roll kneaders. Any combination of these may also be used. The resulting resin composition may be pelletized in any method and then formed into a film, such as, for example, using a calender machine or a combination of an extruder with a T-die. The pelletization may be carried out in such a method as hot cutting, strand cutting or underwater cutting. Alternatively, the melt-kneaded resin composition may be fed as such to a calender machine or a T-die to be formed into a film. The calender machine may be any one, such as, for example, an upright-type three-roll machine, an upright-type four-roll machine, an L-type four-roll machine, an inverted L-type four-roll machine or a Z-type rolls machine. The extruder may be any one, such as, for example, a single screw extruder, a co-rotating twin-screw extruder or a counter-rotating twin-screw extruder. The T-die may be any one, such as, for example, a manifold die, a fish-tail die or a coat-hanger die.

The electrically conductive resin film thus obtained may be crosslinked or cured in any known method, for example, by means of electron beam irradiation, to enhance heat resistance and chemical resistance of the film.

The electrically conductive resin film made of the present resin composition has a volume resistivity in $\Omega \cdot cm$, $\rho$, measured according to the Japanese Industrial Standards (JIS) K 7194, of 10 $\Omega \cdot cm$ or less and the volume resistivity, $\rho$, meets the following equation (1):

$$\mathrm{Log}\ \rho <= 0.02E - 1.4 \qquad (1)$$

wherein E is a tensile elongation in % of the film which is measured according to JIS K 7127.

In general, electrically conductive resin films need to have a volume resistivity of 10 $\Omega \cdot cm$ or less to be used as electrodes or coatings on the electrodes, for example, in redox flow batteries. The volume resistivity is preferably 1.0 $\Omega \cdot cm$ or less, more preferably 0.1 $\Omega \cdot cm$ or less. The lower the volume resistivity is, the more preferable the film is.

Further, electrically conductive resin films need to have good mechanical properties such as tensile elongation, durability to bending and flexibility so that electrodes in a form of the films or coatings composed of the films on electrodes are not easily broken by a physical force. Therefore, an electrically conductive film having a lower volume resistivity and higher mechanical properties such as a tensile elongation is more practical and more useful in industrial applications.

The electrically conductive resin film made of the present resin composition has a volume resistivity, $\rho$, of 10 $\Omega \cdot cm$ or less, and meets the equation (1). Therefore, the film may suitably be used as electrodes or protective coatings on the electrodes, for example, in redox flow batteries, zinc-chlorine batteries and zinc-bromine batteries.

The film meeting the equation (1) has a better balance between a volume resistivity, $\rho$, and a tensile elongation, E, compared to films not meeting the equation (1). FIG. 1 is a semilog graph showing a relation between the volume resistivity, $\rho$, and the tensile elongation, E, of the films of the Examples (indicated by the symbol, ○) and the Comparative Examples (indicated by the symbol, ◇). In the graph, the ordinate is for $\rho$, and the abscissa is for E. Line (1) shows the equation, Log $\rho = 0.02$ E$-1.4$, and line (2) shows the equation, Log $\rho = 0.02$ E$-1.6$. When a film has a lower volume resistivity, $\rho$, and a higher tensile elongation, E, the film is more preferred as electrodes, for example, in redox flow batteries. Therefore, it can be said that in the graph of FIG. 1, the nearer to zero the volume resistivity, $\rho$, is and the farther from zero in the right direction the tensile elongation, E, is, the better the aforesaid balance is. As seen in FIG. 1, the films of the Examples meet the equation (1), that is, they are on or below the line (1). This means that these films have the superior balance, compared to the films of the Comparative Examples. The better the balance is, the more preferable the film is. It is more preferred that the following equation (2) is met.

$$\text{Log } \rho \leq 0.02E - 1.6 \quad (2)$$

The volume resistivity, $\rho$, and the tensile elongation, E, herein are determined by the following method.

(1) Volume Resistivity, $\rho$:

A volume resistivity was measured by a 4-pin probe method (probe method) according to JIS K 7194. The film was conditioned in a test chamber at a temperature of 23±2 degrees C. and a relative humidity of 50±5% for 24 hours or more, and was cut in a size of 80 mm in the machine direction×50 mm in the width direction to prepare a specimen. The specimen was subjected at its five positions to the measurement using a resistivity meter, Loresta GPMCP-T610 (trade name, ex Mitsubishi Chemical Analytec Co., Ltd.), with a probe having pins linearly arranged at a constant interval of 5 mm. This measurement was carried out on three specimens to obtain 15 results of the volume resistivity in total. These values were averaged to determine the volume resistivity, $\rho$, of the film. A thickness of the film was measured using Dial Thickness Gauge H-1A (trade name, ex Ozaki MFG. Co., Ltd.) according to the dimension measurement of specimens in JIS K 7194. For the method for measuring an electric resistivity and its theory, reference may be made, for example, to the home page of Mitsubishi Chemical Analytec Co., Ltd. (http://www.mccat.co.jp/3seihin/genri/ghlup2.htm).

(2) Tensile Elongation, E:

A tensile elongation was measured according to JIS K 7127. The film was conditioned in a test chamber at a temperature of 23±2 degrees C. and a relative humidity of 50±5% for 24 hours or more, and was cut into a form of a specimen type No. 1 dumbbel so that the width direction of the film was a tensile direction, and then subjected to a tensile test under the conditions of the initial distance between chucks of 120 mm, the distance between gauge lines of 50 mm, and the tensile speed of 5 mm/minute to obtain an elongation at break. This test was carried out on five specimens. The results were averaged to determine the tensile elongation, E, of the film. A thickness of the film was determined by measuring a thickness each at ten points between the gauge lines of a specimen, using Dial Thickness Gauge H-1A (trade name, ex Ozaki Mfg. Co., Ltd.) and then averaging the results.

EXAMPLES

In the following, the present invention will be illustrated by the Examples, but are not limited thereto.

Examples 1 to 11 and Comparative Examples 1 to 14

The composition consisting of the components in the amount ratio as shown in Table 1 was melt-kneaded using a 5 L-volume intensive mixer, ex Nippon Roll MFG. Cp., Ltd. The discharge temperature was 190 degrees C. Then, a film having a thickness of 300 μm was obtained using an inverted L-type four-roll calender machine having a roll diameter of 200 mm and a roll width of 700 mm, ex Nippon Roll MFG. Cp., Ltd. The roll temperatures were 205 degrees C., 205 degrees C., 185 degrees C. and 175 degrees C. for the first roll, the second roll, the third roll and the fourth roll, respectively, and the taking-up speed was 5 m/minute. The resulting film was subjected to the measurements of a volume resistivity, $\rho$, and a tensile elongation, E, and further to the following tests for durability to bending and flexibility. The results are as shown in Table 1.

(3) Durability to Bending

The film was conditioned in a test chamber at a temperature of 23±2 degrees C. and a relative humidity of 50±5% for 24 hours or more, and was cut into a form of specimen type 1B according to JIS K 7127 so that the machine direction of the film was a tensile direction to prepare a specimen. The specimen was folded at an angle of 180 degrees so that the whole parts to be chucked at the ends of the specimen were overlapped with each other, squeezed through fingers and then unfolded. Then, the specimen was folded at an angle of 180 degrees in the opposite direction, squeezed through fingers and then unfolded. These operations as one set were repeated along the one and same crease. The criteria are as follows.

G: The film did not break even after six sets.
M: The film broke in 2 to 6 sets.
B: The film broke in one set.

(4) Flexibility

A modulus at 5% elongation was determined as a measure of flexibility on the stress-strain curve obtained above in the tensile test in (2). A smaller modulus means that flexibility is higher.

The materials used were as follows:

Component (A)
(A-1): ELASLEN 404B (trade name), chlorinated polyethylene, chlorine content: 40% by mass, melt flow rate (180 degrees C., 211.8N): 25 g/10 min., melting enthalpy: 29 J/g, ex Showa Denko Inc.;
(A-2): ELASLEN 303B (trade name), chlorinated polyethylene, chlorine content: 32% by mass, melt flow rate (180 degrees C., 211.8N): 25 g/10 min., melting enthalpy: 50 J/g, ex Showa Denko Inc.;
(A-3): D9100.00 (trade name), low density polyethylene, melt flow rate (190 degrees C., 21.18N): 1 g/10 min., density: 877 kg/m$^3$, ex Dow Chemical;

Component (B)
(B-1): Nanocyl NC7000 (trade name), multi-wall carbon nanotube, average diameter: 9.5 nm, average length: 1.5 μm, bulk specific gravity: 0.043 g/cm$^3$, purity: 90% by mass, ex Nanocyl S.A.;
(B-2): VGCF-X (trade name), multi-wall carbon nanotube, average diameter: 15 nm, average length: 3 μm, bulk specific gravity: 0.08 g/cm$^3$, purity: 93% by mass, ex Showa Denko Inc.);
(B-3): C100 (trade name), multi-wall carbon nanotube, average diameter: 12 nm, average length: 1 μm, bulk specific gravity: 0.1 g/cm$^3$, purity: 90% by mass, ex Arkema Inc.;

Component (C)
(C-1): DENKA BLACK Granule (trade name), acetylene black, average diameter of primary particles determined by observation under a transmission electron microscope (TEM): 35 nm, specific surface area: 69 m$^2$/g; ex Denki Kagaku Kogyou Inc.;
(C-2): Z-5F (trade name), ground natural graphite, flaky, average diameter: 4 μm, ex Ito Graphite Co., Ltd.;

Comparative Component (C)
(C-3): KJ300 (trade name), ketjen black, ex Lion Corporation;

Component (D)
(D-1): Torayca Cut Fiber T008A-006 (trade name), carbon fiber, cut length: 6 mm, fiber diameter: 7 μm, ex Toray Industries, Ltd.;

Optional Component
STANNJF-95B (trade name), stabilizer for chlorinated polyethylene, ex Nitto Kasei Kyogyo Inc.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| (A) | (A-1) | 100 | 100 | 100 | 100 |  | 100 | 100 | 100 |  | 100 | 100 |
|  | (A-2) |  |  |  |  | 100 |  |  |  |  |  |  |
|  | (A-3) |  |  |  |  |  |  |  |  | 100 |  |  |
| (B) | (B-1) | 40 | 40 | 25 | 10 | 25 | 25 |  |  |  | 40 | 30 |
|  | (B-2) |  |  |  |  |  |  | 40 |  |  |  |  |
|  | (B-3) |  |  |  |  |  |  |  | 25 |  |  |  |
| (C) | (C-1) | 40 | 20 | 40 | 40 | 40 |  | 40 | 40 | 25 | 60 | 30 |
|  | (C-2) |  |  |  |  |  | 40 |  |  |  |  |  |
| Comp. (C) | (C-3) |  |  |  |  |  |  |  |  |  |  |  |
| (D) | (D-1) | 20 | 20 | 20 | 20 | 20 | 20 | 20 | 20 | 20 |  |  |
| Optional component | Stabilizer | 2 | 2 | 2 | 2 | 2 | 2 | 2 | 2 | 2 | 2 | 2 |
| Evaluation results | Volume resistivity, $\rho$, $\Omega \cdot cm$ | 0.072 | 0.088 | 0.15 | 3.0 | 0.17 | 0.28 | 0.080 | 0.26 | 0.25 | 0.14 | 0.35 |
|  | Tensile elongation, E, % | 25 | 33 | 58 | 118 | 77 | 50 | 24 | 47 | 249 | 34 | 96 |
|  | Log$\rho$ | −1.14 | −1.06 | −0.82 | 0.48 | −0.77 | −0.55 | −1.10 | −0.59 | −0.60 | −0.85 | −0.46 |
|  | 0.02E−1.4 | −0.90 | −0.74 | −0.24 | 0.96 | 0.14 | −0.40 | −0.92 | −0.46 | 3.58 | −0.72 | 0.52 |
|  | 0.02E−1.6 | −1.10 | −0.94 | −0.44 | 0.76 | −0.06 | −0.60 | −1.12 | −0.66 | 3.38 | −0.92 | 0.32 |
|  | Durability to bending | G | G | G | G | G | G | G | G | G | G | G |
|  | 5% Modulus, Mpa | 14.9 | 12.7 | 9.7 | 7.1 | 9.9 | 7.2 | 15.0 | 10.1 | 5.2 | 10.9 | 4.7 |

|  |  | Comp. Ex. 1 | Comp. Ex. 2 | Comp. Ex. 3 | Comp. Ex. 4 | Comp. Ex. 5 | Comp. Ex. 6 | Comp Ex. 7 |
|---|---|---|---|---|---|---|---|---|
| (A) | (A-1) | 100 | 100 | 100 | 100 | 100 | 100 | 100 |
|  | (A-2) |  |  |  |  |  |  |  |
|  | (A-3) |  |  |  |  |  |  |  |
| (B) | (B-1) | 120 | 60 | 40 | 35 |  | 40 | 40 |
|  | (B-2) |  |  |  |  |  |  |  |
|  | (B-3) |  |  |  |  |  |  |  |
| (C) | (C-1) |  |  |  |  | 60 |  |  |
|  | (C-2) |  |  |  |  |  |  |  |
| Comp. (C) | (C-3) |  |  |  |  |  |  |  |
| (D) | (D-1) |  |  |  |  |  | 20 | 60 |
| Optional component | Stabilizer | 2 | 2 | 2 | 2 | 2 | 2 | 2 |
| Evaluation results | Volume resistivity, $\rho$, $\Omega \cdot cm$ | 0.11 | 0.12 | 0.25 | 0.44 | 32 | 0.21 | 0.11 |
|  | Tensile elongation, E, % | 11 | 21 | 22 | 23 | 230 | 20 | 17 |
|  | Log$\rho$ | −0.96 | −0.92 | −0.60 | −0.36 | 1.51 | −0.68 | −0.96 |
|  | 0.02E−1.4 | −1.18 | −0.98 | −0.96 | −0.94 | 3.20 | −1.00 | −1.06 |
|  | 0.02E−1.6 | −1.38 | −1.18 | −1.16 | −1.14 | 3.00 | −1.20 | −1.26 |
|  | Durability to bending | B | G | G | G | G | M | B |
|  | 5% Modulus, Mpa | 11.8 | 5.8 | 3.2 | 2.8 | 3.8 | 10.3 | 13.8 |

|  |  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| (A) | (A-1) | 100 | 100 | 100 | 100 | 100 | 100 | 100 |
|  | (A-2) |  |  |  |  |  |  |  |
|  | (A-3) |  |  |  |  |  |  |  |
| (B) | (B-1) | 35 | 20 |  |  |  | 40 | 40 |
|  | (B-2) |  |  |  |  |  |  |  |
|  | (B-3) |  |  |  |  |  |  |  |
| (C) | (C-1) |  |  | 60 | 60 | 40 |  |  |
|  | (C-2) |  |  |  |  |  |  |  |
| Comp. (C) | (C-3) |  |  |  |  | 25 | 60 | 40 |
| (D) | (D-1) | 35 | 30 | 40 | 60 | 20 |  | 20 |
| Optional component | Stabilizer | 2 | 2 | 2 | 2 | 2 | 2 | 2 |
| Evaluation results | Volume resistivity, $\rho$, $\Omega \cdot cm$ | 0.24 | 0.50 | 14 | 4.3 | 0.28 | * | * |
|  | Tensile elongation, E, % | 29 | 35 | 27 | 12 | 16 |  |  |
|  | Log$\rho$ | −0.63 | −0.30 | 1.15 | 0.63 | −0.55 |  |  |
|  | 0.02E−1.4 | −0.82 | −0.70 | −0.86 | −1.16 | −1.08 |  |  |
|  | 0.02E−1.6 | −1.02 | −0.90 | −1.06 | −1.36 | −1.28 |  |  |
|  | Durability to bending | M | G | G | B | B |  |  |
|  | 5% Modulus, Mpa | 8.8 | 6.3 | 7.1 | 9.5 | 19.5 |  |  |

* No film could be formed.

The films of Examples 1 to 11 meet the equation (1), and have the low volume resistivity and the high tensile elongations, durability to bending and flexibility. On the other hand, the films of Comparative Examples 1 to 12 do not meet the equation (1), and have at least one of low tensile elongation, durability to bending, flexibility or electric conductivity. In Comparative Examples 13 and 14 where ketjen black was used in place of component (C), the resin compositions had no ductility in melting when subjected to a film-forming operation and, therefore, could not be formed into a film.

For the film of Example 9, a volume resistivity, $\rho$, was measured also after the tensile test. The film was cut into a size of 100 mm×25 mm, where the width direction of the film was the longitudinal direction of a specimen. A mark was put with a felt pen at the center (intersection of the both diagonals), drawn at a speed of 5 mm/minute until the distance between chucks increased from 50 mm at the beginning to 100 mm. Then a volume resistivity, $\rho$, was determined only at the one marked position, as mentioned in (1) above. The volume resistivity before the tensile test was $2.5 \times 10^{-1}$ $\Omega \cdot$cm, while that after the tensile test was $3.6 \times 10^{0}$ $\Omega \cdot$cm. Thus, the tensile deformation of 100% resulted in only one digit increase in volume resistivity. This means that the electrically conductive resin film made of the present resin composition has much less change in electric conductivity under deformation of the film.

The invention claimed is:

1. A resin composition consisting essentially of:
   (A) 100 parts by mass of a thermoplastic resin,
   (B) 1 to 60 parts by mass of carbon nanotubes, and
   (C) 1 to 100 parts by mass of acetylene black,
   wherein an amount of graphite in the resin composition comprises 0 parts by mass of the total amount of the resin composition.

2. The resin composition according to claim 1, wherein component (A) is at least one selected from the group consisting of polyethylenes and chlorinated polyethylenes.

3. The resin composition according to claim 1, wherein the composition is to be used for an electrode of a redox flow battery.

4. An electrically conductive resin film made of the resin composition according to claim 1.

5. The electrically conductive resin film according to claim 4, wherein the film has a volume resistivity, $\rho$, measured according to JIS K 7194, of 10 $\Omega \cdot$cm or less and the volume resistivity, $\rho$, meets the following equation (1):

$$\mathrm{Log}\ \rho <= 0.02E - 1.4 \tag{1}$$

wherein E is a tensile elongation in % of the film which is measured according to JIS K 7127.

6. The resin composition according to claim 1, wherein the amount of component (B) is more than 10 parts by mass and at most 60 parts by mass relative to 100 parts by mass of component (A).

7. The resin composition according to claim 1, wherein the amount of component (B) is 20 to 60 parts by mass relative to 100 parts by mass of component (A).

8. A resin composition consisting essentially of:
   (A) 100 parts by mass of a thermoplastic resin,
   (B) 1 to 60 parts by mass of carbon nanotubes,
   (C) 1 to 100 parts by mass of acetylene black, and
   (D) 1 to 60 parts by mass of carbon fiber,
   wherein an amount of graphite in the resin composition comprises 0 parts by mass of the total amount of the resin composition.

* * * * *